United States Patent
Tran et al.

(10) Patent No.: US 7,146,086 B2
(45) Date of Patent: Dec. 5, 2006

(54) CONSTRUCTING WELL STRUCTURES FOR HYBRID OPTICAL WAVEGUIDES

(75) Inventors: Ut Tran, San Jose, CA (US); David A. G. Deacon, Los Altos, CA (US); Shing Man Lee, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 10/609,803

(22) Filed: Jun. 30, 2003

(65) Prior Publication Data

US 2004/0264904 A1 Dec. 30, 2004

(51) Int. Cl.
*G02B 6/10* (2006.01)
*G02B 6/00* (2006.01)

(52) U.S. Cl. ................. 385/131; 385/129; 385/130

(58) Field of Classification Search ........ 385/129–132; 65/385, 386, 429, 472
See application file for complete search history.

(56) References Cited

U.S. PATENT DOCUMENTS

| | | | | |
|---|---|---|---|---|
| 5,540,346 A | * | 7/1996 | Fujimoto et al. | 216/24 |
| 6,002,823 A | * | 12/1999 | Chandross et al. | 385/50 |
| 6,031,957 A | | 2/2000 | Suzuki et al. | |
| 6,044,190 A | * | 3/2000 | Kashyap | 385/123 |
| 6,120,693 A | * | 9/2000 | Petti et al. | 216/18 |
| 6,477,295 B1 | * | 11/2002 | Lang et al. | 385/31 |
| 6,732,550 B1 | * | 5/2004 | Won | 65/386 |
| 7,058,265 B1 | * | 6/2006 | Amparan et al. | 385/40 |
| 2001/0046363 A1 | * | 11/2001 | Purchase et al. | 385/140 |
| 2002/0151168 A1 | * | 10/2002 | Wang et al. | 438/624 |
| 2002/0186950 A1 | * | 12/2002 | Mule' et al. | 385/132 |

FOREIGN PATENT DOCUMENTS

| | | |
|---|---|---|
| EP | 1 136 851 | 9/2001 |
| EP | 1 174 763 | 1/2002 |
| JP | 6-242335 | 9/1994 |
| JP | 8-15540 | 1/1996 |

\* cited by examiner

*Primary Examiner*—Sung Pak
(74) *Attorney, Agent, or Firm*—Trop, Pruner & Hu, P.C.

(57) ABSTRACT

A well may be formed for access to an optical waveguide core by a process that results in an L-shaped well. The L-shaped well may then be filled with a polymer. By controlling the size of each portion of well, the occurrence of bubbles within the well and cuts to the core may be reduced.

17 Claims, 2 Drawing Sheets

CONSTRUCTING WELL STRUCTURES FOR HYBRID OPTICAL WAVEGUIDES

BACKGROUND

This invention relates generally to well structures for hybrid optical waveguides.

An optical waveguide is a structure that conveys an optical light signal. Conventionally, an optical waveguide may include a substrate and a core encased within an upper and lower cladding. The bulk of the light signal typically travels within the core along the axis of the waveguide structure.

In order to access the core, a well may be formed through the upper cladding. This well may be formed by etching the upper cladding. Sometimes such etching does not completely expose the core of the waveguide, resulting in reduced access to the light signal. In other cases, the core of the waveguide might not only be exposed but it may be damaged by the etching process, resulting in reduced transmission of the light signal.

After the well is formed, the well may be filled with a polymer. If the well is not appropriately formed, voids may be formed within the well where the polymer cannot completely fill the well, also resulting in reduced transmission of the light signal.

Thus, there is a need to form wells for accessing optical cores in hybrid optical circuits that are less prone to forming voids or bubbles or cuts or other damage to the core itself.

DETAILED DESCRIPTION

Figure 1:
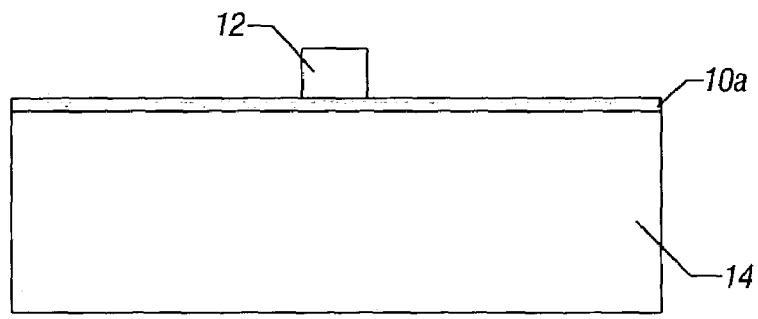
FIG. 1 is an enlarged, cross-sectional view of one embodiment of the present invention at an early stage of manufacture.

Referring to the transverse cross-sectional view of FIG. 1, a substrate 14 may be covered with a lower cladding 10. The lower cladding may be, for example, a silica material. A core 12 may be formed as a ridge or line over the lower cladding 10. The axis of the ridge is oriented perpendicular to the transverse plane shown in FIG. 1. The core may, for example, be a germanium doped silica or an oxynitride material.

Figure 2:
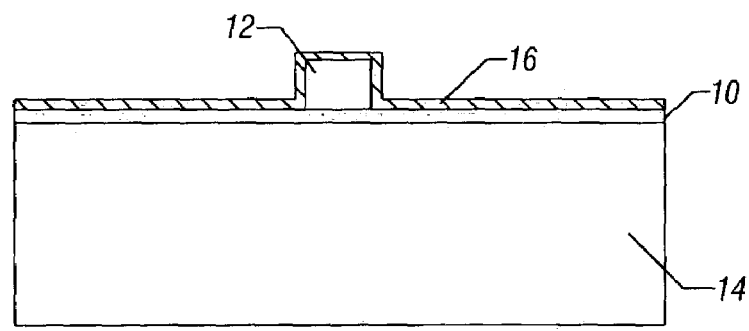
FIG. 2 is an enlarged, cross-sectional view of the embodiment shown FIG. 1 at a subsequent stage of manufacture in accordance with one embodiment of the present invention.
Figure 3:
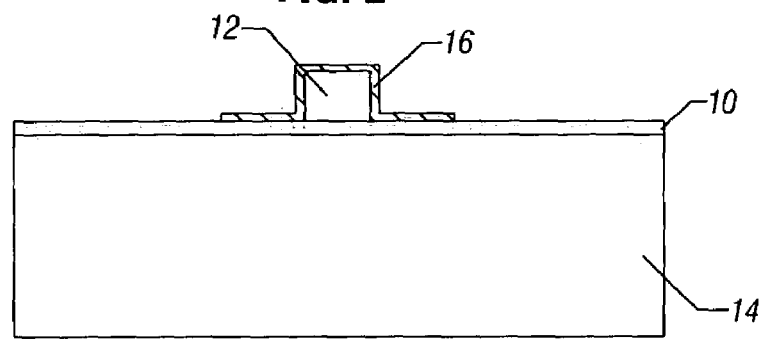
FIG. 3 is an enlarged, cross-sectional view at a subsequent stage in accordance with one embodiment of the present invention.

As shown in FIG. 2, a thin seed layer 16 of a metallic material, such as nickel, may be formed across the core 12 and the lower cladding 10. In one embodiment, the metal 16 may be deposited. Using standard photo-lithographic processes, a first mask is defined on the seed layer 16. The seed layer 16 is then etched to the desired pattern as shown in transverse cross section in FIG. 3. A wet etch may be advantageous for this etching process since the seed layer 16 can be fully removed from the non-patterned areas, reducing optical losses from residual etch-stop material. The pattern of the seed layer 16 may have a width as shown in FIG. 3 transverse of the axis of the core 12, and it may have a length (not shown) along the axial direction of the core 12 around a selected point on the core 12. The cross section of the figures is taken through the selected point.

Figure 4:
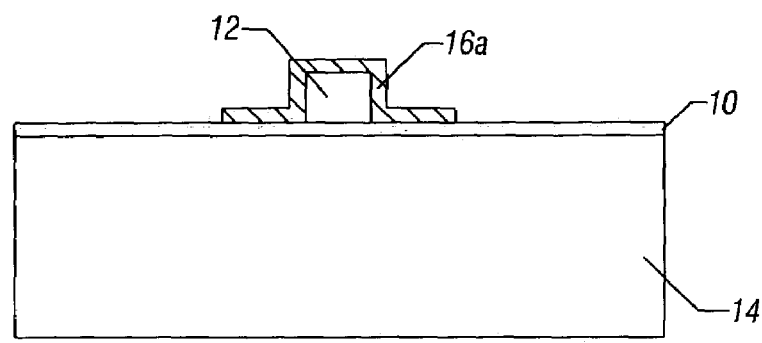
FIG. 4 is an enlarged, cross-sectional view at a subsequent stage in accordance with one embodiment of the present invention.

After removal of any masking materials, the thickness of the etch stop layer 16a may be increased by plating additional metal, such as nickel, up to a thickness of 2 microns in one embodiment of the present invention shown in FIG. 4. The etch stop layer 16a retains a pattern of the seed layer 16 reproducibly.

Figure 5:
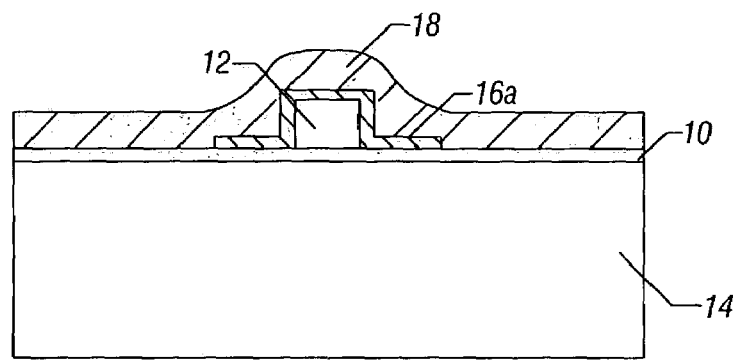
FIG. 5 is an enlarged, cross-sectional view at a subsequent stage in accordance with one embodiment of the present invention.
Figure 6:
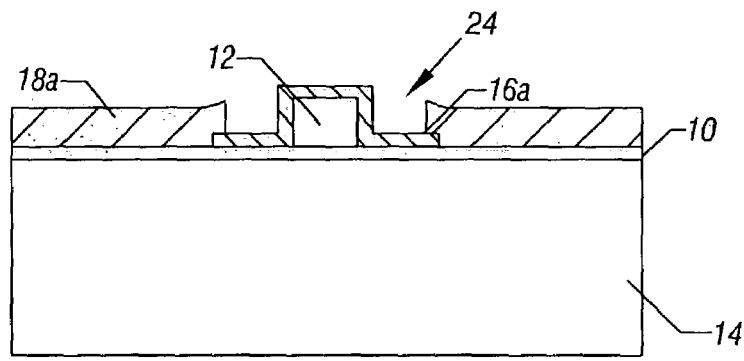
FIG. 6 is an enlarged, cross-sectional view at a subsequent stage of manufacture in accordance with one embodiment of the present invention.

Referring next to FIG. 5, a top cladding 18 may be applied by any of a number of well known processes, such as plasma enhanced chemical vapor deposition (PECVD), followed by annealing. A second mask layer is applied and patterned and the upper portion of a well 24 is formed, for example by dry etching through the top cladding 18 down to the etch stop layer 16a, as shown in FIG. 6.

Figure 7:
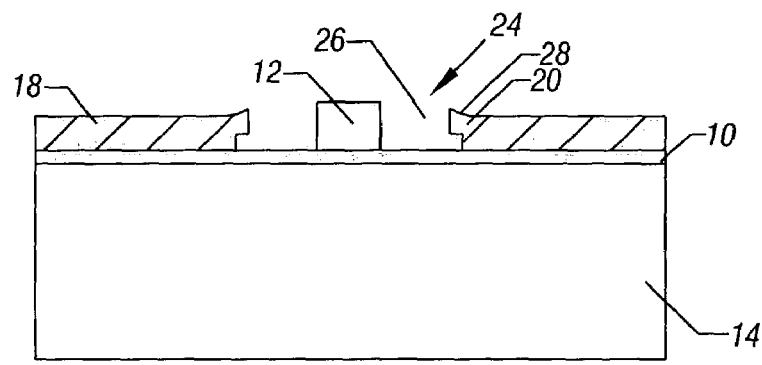
FIG. 7 is an enlarged, cross-sectional view at a subsequent stage of manufacture in accordance with one embodiment of the present invention.

The etch stop layer 16a is then completely removed as shown in FIG. 7. In one embodiment, the etch stop layer 16a may be removed by a wet etch using a differential etch formulation that thoroughly removes the etch stop layer 16a without significantly affecting the cladding layers 10 and 18 or the core 12. Removing the etch stop layer 16a exposes the substantially unaffected core 12 within the well 24.

Provided that the opening produced by the second mask is smaller than the etch stop 16a pattern produced by the first mask, the dimensions of the well 24 are determined, in its upper region 26, by the dimensions of the second mask and its process parameters and, in the lower region 20, by the first mask and its process parameters.

As shown in FIG. 7, the lower region 20 of the well 24 has a depth determined by the thickness of the etch stop layer 16a. The upper region 26 of the well 24 is narrower than the long region 20, forming an overhang 28 in one embodiment. Depending on the alignment of the second mask relative to the first mask, this overhang 28 may be asymmetric.

Figure 8:
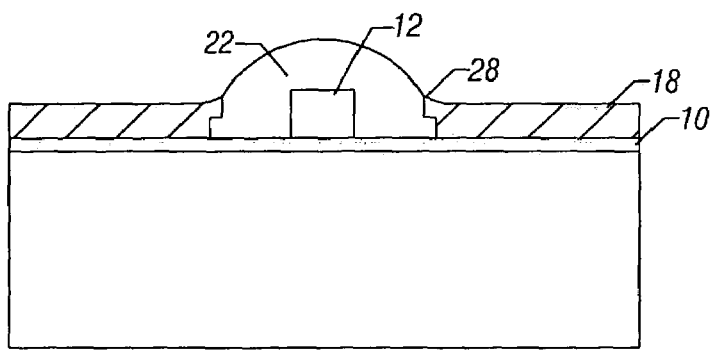
FIG. 8 is an enlarged, cross-sectional view at a subsequent stage of manufacture in accordance with one embodiment of the present invention.

A polymer 22 may be dispensed into the well 24 as shown in FIG. 8. The polymer spreads outwardly from its initial point of contact until it reaches the furthest most edges of the well 24. If the lower portion 20 of the well 24 is deep enough, the polymer 22 may fully wet the furthest edge of the well 24 along the lower surface of the overhang 28, resulting in a complete fill as shown in FIG. 8. If, on the other hand, the etch stop layer 16a is too thin, the spreading polymer 22 bridges up from the floor of the well 24 to the inside of the overhang 28, leaving behind a trapped air pocket or bubble under the overhang.

The effect of such a bubble can be very negative on the performance of the finished waveguide. The index of refraction difference between the inside and the outside of the bubble is typically 0.5, resulting in strong optical scattering and refraction. Any bubbles within the optical path of the waveguide may degrade the insertion loss.

By enlarging the size of the well 24 until any bubbles trapped at its edge lay outside the optical path, the problem may be reduced. However, such a method may leave the problem unchanged at the ends of the waveguide where bubbles may be trapped directly between the core 12 and the upper cladding 18. By making the etch stop layer 16a thick enough so that the dynamics of the polymer 22 spreading produces full wetting under the overhang 28, bubble formation may be reduced.

A cut is the opposite type of problem. If the second mask is displaced along the direction of the waveguide so that the overhang 28 becomes negative, the etch of the top cladding 18 produces a cut in the core 12. The depth of this cut will depend on the process parameters. This imperfection may produce scatter and refraction loss just as a bubble does, although with a refractive index difference corresponding to the core 12 to polymer 22 refractive index difference. Since the cut is located within the core, its optical effects can be severe.

By using a two-step fabrication for the etch stop layer 16a, both bubbles and cuts may be reduced. Cuts may be reduced by making the second mask pattern smaller than the first so that the alignment errors in the process do not permit etching of the core. Unfortunately, this approach creates the possibility of bubbles trapped into the resultant overhang 28. Bubbles may be reduced by using an etch stop layer 16a that is thick enough to raise the overhang 28 above a threshold level where complete wetting occurs at the edge of the well and under the overhang 28.

The dual layer metal etch stop 16a is used because the seed layer 16 may be very thin and is reproducibly patterned with a wet etch step that removes traces of the metal (and thereby optical loss) from the waveguide. The dual metal etch stop 16a may also be advantageous because the thickness of the patterned etch stop layer can be reproducibly manufactured by controlling the deposition process and time.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   covering an optical core with a relatively thin metal seed layer;
   forming a well in an upper cladding material to expose said optical core such that a portion of said cladding overlies said well; and
   filling the well with a polymer.

2. The method of claim 1 including removing a portion of the seed layer extending beyond a first distance from said core.

3. The method of claim 2 including depositing additional metal on the remaining portion of said seed layer forming a thickened seed layer.

4. The method of claim 3 including covering said thickened seed layer and said core with said upper cladding material.

5. The method of claim 4 including fanning an aperture over said core through said upper cladding material to a distance from said core less than said first distance.

6. The method of claim 5 including removing said seed layer and said additional metal.

7. The method of claim 6 including forming said well having an upper portion smaller than a lower portion.

8. The method of claim 7 including forming said well having a lower portion that extends further away from said core than said upper portion.

9. The method of claim 8 including forming said lower portion to have a height sufficient that said polymer can completely fill said lower portion.

10. The method of claim 1 including removing a portion of the seed layer extending beyond a second distance along the axial direction from a selected point along said core.

11. The method of claim 7 including forming said well having a lower portion that extends further away along the axial direction from a selected point along said core than said upper portion.

12. A method comprising:
    forming a lower cladding on a substrate;
    defining a core over said lower cladding;
    covering said core with a relatively thin metal seed layer;
    removing a portion of said seed layer extending beyond a first distance from said core;
    depositing additional metal on the remaining portion of said seed layer forming a thickened seed layer;
    covering said thickened seed layer and said core with an upper cladding material; and
    forming an aperture over said core through said upper cladding material to a distance from said core less than said first distance.

13. The method of claim 12 including removing said seed layer and said additional metal.

14. The method of claim 13 including forming a well in said upper cladding having an upper portion smaller than, a lower portion.

15. A method comprising:
    forming a lower cladding on a substrate;
    defining a core over said lower cladding;
    covering said core with a relatively thin metal seed layer;
    removing a portion of said seed layer extending beyond a second distance along the axial direction from a selected point along said core;
    depositing additional metal on the remaining portion of said seed layer forming a thickened seed layer;
    covering said thickened seed layer and said core with an upper cladding material; and
    forming an aperture over said core through said upper cladding material to a distance along the axial direction from a selected point along said core less than said second distance.

16. The method of claim 15 including removing said seed layer and said additional metal.

17. The method of claim 16 including forming a well in said upper cladding having an upper portion smaller along the axial direction from a selected point along said core than a lower portion.

* * * * *